United States Patent [19]

Joshi et al.

[11] 4,307,163

[45] Dec. 22, 1981

[54] LITHIUM OXIDE HALIDE SOLID STATE ELECTROLYTE

[75] Inventors: Ashok V. Joshi, Fishkill, N.Y.; William P. Sholette, Warminster, Pa.

[73] Assignee: Ray-O-Vac Corporation, Madison, Wis.

[21] Appl. No.: 200,276

[22] Filed: Oct. 24, 1980

[51] Int. Cl.$^3$ .............................................. H01M 6/18
[52] U.S. Cl. .................................. 429/191; 429/193; 429/199
[58] Field of Search ................. 429/193, 191, 30, 199; 204/195 S, 1 S; 252/62.2

[56] References Cited

U.S. PATENT DOCUMENTS 3,911,085 10/1975 Bither et al. .................... 429/191 X
4,184,015 1/1980 Reau et al. ........................ 429/193
4,226,628 10/1980 Bartholomew ................ 429/193 X Primary Examiner—Anthony Skapars
Attorney, Agent, or Firm—Raymond J. Kenny; Francis J. Mulligan, Jr.

[57] ABSTRACT

A solid-state electrolyte capable of lithium ion transfer comprising and interdiffused combination of a lithium metal oxide and a metal halide.

6 Claims, No Drawings

LITHIUM OXIDE HALIDE SOLID STATE ELECTROLYTE

The present invention is concerned with solid-state electrolytes for use in solid-state batteries which use lithium anodes.

HISTORY OF THE ART AND OBJECT OF THE INVENTION

A number of solid-state electrolytes are known which are capable of carrying electric current electrolytically by transport of lithium ions and which are electronic insulators.

It is an object of the invention to provide a novel series of electrolytes which have electrolytic conductivities greater than about $10^{-6}$ [ohm-centimeter]$^{-1}$ (ohm-cm)$^{-1}$. This level of conductivity makes these electrolytes useful in low rate, high energy density, solid-state battery systems capable of powering microelectronic items.

DISCOVERY

It has now been discovered that a large number of practical solid-state electrolytes can be provided by interdiffusing "A" materials having the general formula $$LiM'\,O_n$$

with "B" materials having the general formula $$Li_xM''_yX_z$$

in which compounds
X = a halide atom advantageously an iodine atom
M' and M" represent one or two elements from Groups IIA, IIIA, IIIB, IVA, IVB, VA and VB of the periodic table of elements, particularly that Table as published in Handbook of Chemistry and Physics, Chemical Rubber Publishing Company, 44th Edition, pages 448 and 449.
n = a number depending upon the valence of M' to provide neutral oxidic stoichiometry and calculated by the formula n = (1 + valence of M'/2)
x = 0 or a number up to 1
y = a number from 0.1 to 1
z = a number depending in part upon the valence of M" to provide halidic stoichiometry and calculated by the formula
z = x + y(valence of M")

Generally speaking in the electrolytes of the present invention the materials "A" and "B" are used in proportions of about 10 to about 40 mole percent (m/o) of "B" balance essentially "A". In making the electrolytes of the present invention, it is advantageous to prepare a thorough mixture of dry powders of materials "A" and "B" and then heat that mixture to a temperature in excess of the melting point of one of the constituents, maintain that temperature for a time in excess of 0.25 hour, cool the thus interdiffused material rapidly and grind the resultant cooled mass to a powder which can be pressed into the form of an electrolyte pellet.

PARTICULAR DESCRIPTION

In carrying the invention into practice, it is advantageous to use as M' and M" elements from the group consisting of aluminum, boron and calcium. These elements are relatively cheap and form stable, solid-state oxides and halides. The halogen used in the electrolytes of the present invention is advantageously iodine in view of the known quality of lithium iodide of being a better solid-state electrolytic conductor than lithium chloride, lithium bromide or lithium fluoride. The electrolytes of the present invention can contain, in addition to materials "A" and "B", aluminum oxide in amounts up to about 50% of the total molar composition making an illustrative range of materials in electrolytes, in mole percent, about 5% to about 40% "B", about 30% to about 90% "A" and up to about 50% alumina.

Those skilled in the phase equilibrium art will recognize that although the electrolytes of the present invention are made by interdiffusing materials "A" and "B" (and optionally alumina), the resultant electrolyte may not necessarily contain either material "A" or "B" as such. It is the intent that the claims, appended hereto and directed to electrolytes, will dominate the compositions resulting from interdiffusion of materials "A" and "B" regardless of the nature of the chemical species actually present in the electrolytes. The term "materials A" and "B" has been deliberately used instead of in preference to the word "compound". Material is used in this specification and claims to include not only a true chemical compound but also a mixture or assemblage of materials chemically equivalent to materials "A" and "B" but not necessarily introduced into an interdiffusing zone at the same time. For example, if material "A" is $LiAlO_2$ and material "B" is $LiMgI_3$, it matters not at all to this invention whether the materials interdiffused are these compounds per se of any mixture of assemblage of $Li_2O$, $Al_2O_3$, LiI and $MgI_2$ or even the elements per se provided that the ingredients are provided in the amounts represented by the respective oxidic and iodic formulas and in the proportions of materials "A" and "B" as required herein.

In order to give those skilled in the art a better understanding and greater appreciation of the invention, the following Examples are given.

EXAMPLE I

A mixture of 70 mole percent (m/o) $LiBO_2$ and 30 m/o $CaI_2$ was ground, heated to 800° C. for ½ hour, quenched and reground. A solid electrolyte was thus formed, having the compositional formula 0.7 $LiBO_2$, 0.3 $CaI_2$. Conductivity cells were typically made by pressing electrolyte to 100,000 psi in a 0.60″ diameter steel die and then pressing on lithium electrodes at 50,000 psi. The D.C. conductivity was measured at room temperature and was found to be $4 \times 10^{-6}$(ohm-cm)$^{-1}$. Also no apparent reaction was observed with the lithium electrodes, thus indicating a stable electrolyte. Two solid-state cells (0.6″ diameter) were fabricated using this newly developed electrolyte with lithium as an anode and a mixture of $BiBr_3$, $TiS_2$ and Bi as the cathode. These cells showed OCV of 2.67 volts and short circuit currents of 130μ amps at room temperature.

EXAMPLE II

A mixture of 75 m/o $LiAlO_2$ and 25 m/o $LiAlI_4$ was ground for one hour and then heated at 900° C. for 15 minutes. This mixture was then quenched to ambient temperature and reground to a powder. A conductivity cell was fabricated using this mixture as solid electrolyte and lithium as electrodes. The conductivity was $9 \times 10^{-7}$(ohm-cm)$^{-1}$ at ambient temperature. No apparent reaction was observed for this electrolyte with lithium electrodes indicating a stable electrolyte.

EXAMPLE III

A mixture of 70 m/o $LiAlO_2$ and 30 m/o $CaI_2$ was ground for one hour; then heated to 900° C. for 30 minutes. This hot mix was then quenched to room temperature. After the material had cooled, it was ground for one hour. A conductivity cell was fabricated using this electrolyte and lithium electrodes. The conductivity was $1.7 \times 10^{-6} (ohm\text{-}cm)^{-1}$ at ambient temperature. No apparent reaction was observed at Li/electrolyte interface indicating a stable electrolyte.

EXAMPLE IV

An electrolyte made by interdiffusing 60 m/o $LiAlO_2$, 20 m/o $LiAlI_4$ and 20 m/o $Al_2O_3$ for one hour at 900° C. exhibited a room temperature conductivity of $4.0 \times 10^{-6} (ohm\text{-}cm)^{-1}$.

EXAMPLE V

An electrolyte containing 60 m/o $LiBO_2$, 20 m/o $LiAlI_4$ and 20 m/o $Al_2O_3$ and interdiffused at 500° C. for 24 hours exhibited a room temperature conductivity of $1.2 \times 10^{-6} (ohm\text{-}cm)^{-1}$.

Additional Examples are set forth in the following Table.

TABLE

| Ex. No. | Composition (m/o) | | Interdiffusion | | Conductivity $(ohm\text{-}cm)^{-1}$ |
|---|---|---|---|---|---|
| | | | Temp (°C.) | Time (Hr) | |
| VI | $LiBO_2$ | −67 | 800 | 0.35 | $5.4 \times 10^{-6}$ |
| | $CaI_2$ | −33 | | | |
| VII | $LiBO_2$ | −60.3 | 800 | 0.35 | $4.3 \times 10^{-6}$ |
| | $CaI_2$ | −29.7 | | | |
| | $Al_2O_3$ | −10 | | | |
| VIII | $LiBO_2$ | −53.3 | 800 | 0.35 | $3.5 \times 10^{-6}$ |
| | $CaI_2$ | −26.7 | | | |
| | $Al_2O_3$ | −20 | | | |
| IX | $LiBO_2$ | −44.9 | 800 | 0.35 | $1.3 \times 10^{-6}$ |
| | $CaI_2$ | −22.1 | | | |
| | $Al_2O_3$ | −33 | | | |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A solid-state electrolyte for use in electrochemical devices consisting essentially of an interdiffused mixture of lithium ion, oxygen, a halide and at least one element from the group of M' and M'', said electrolyte having a composition calculated to result from the interdiffusion of a material "A", and material "B", said material "A" being representable by a formula $LiM'O_n$ and said material B being representable by a formula $Li_xM''_yX_z$ wherein, in said formulas, X = is a halide atom, M' and M'' represent at least one element from Groups IIA, IIIA, LLB, IVA, IVB, VA and VB of the Periodic Table, n = is a number depending on the valence of M' and calculated by $$n = (1 + \text{valence of M'}/2)$$

x = is 0 or a number up to 1, y = is a number from 0.1 to 1, and z = is a number depending in part on the valence of M'' and calculated by $z = x + y$ (valence of M'').

2. An electrolyte as in claim 1 wherein X is an iodine atom.

3. An electrolyte as in claim 1 wherein M' and M'' represent at least one element from the group of aluminum, boron and calcium.

4. An electrolyte as in claim 1 which contains up to about 50 mole percent of alumina.

5. An electrolyte as in claim 1 in which material "A" is $LiAlO_2$ and material "B" is $CaI_2$.

6. An electrolyte as in claim 1 in which material "A" is $LiBO_2$ and material "B" is $CaI_2$.

* * * * *